(12) United States Patent
Sugiyama et al.

(10) Patent No.: US 8,553,182 B2
(45) Date of Patent: Oct. 8, 2013

(54) LIQUID CRYSTAL DISPLAY DEVICE INCLUDING A LIGHT-BLOCKING MEMBER

(75) Inventors: Hiroki Sugiyama, Tottori (JP);
Shinichiro Nomura, Tottori (JP);
Takayuki Kato, Tottori (JP); Satoshi Morita, Tottori (JP)

(73) Assignee: Japan Display West, Chita-Gun, Aichi-Ken (JP)

( * ) Notice: Subject to any disclaimer, the term of this patent is extended or adjusted under 35 U.S.C. 154(b) by 1073 days.

(21) Appl. No.: 11/523,629

(22) Filed: Sep. 20, 2006

(65) Prior Publication Data
US 2007/0070279 A1 Mar. 29, 2007

(30) Foreign Application Priority Data

Sep. 26, 2005 (JP) ................................. 2005-278287
Apr. 28, 2006 (JP) ................................. 2006-124918

(51) Int. Cl.
*G02F 1/1333* (2006.01)
*G02F 1/1343* (2006.01)

(52) U.S. Cl.
USPC ........................................ 349/110; 349/139

(58) Field of Classification Search
USPC ................................................. 349/110, 111
See application file for complete search history.

(56) References Cited

U.S. PATENT DOCUMENTS

| | | | |
|---|---|---|---|
| 5,402,141 A * | 3/1995 | Haim et al. ...................... | 345/88 |
| 6,122,025 A | 9/2000 | Kim | |
| 6,462,344 B1 * | 10/2002 | Joo et al. ................... | 250/370.09 |
| 7,236,220 B2 | 6/2007 | Kim et al. | |
| 7,271,856 B2 * | 9/2007 | Kim et al. ....................... | 349/43 |
| 2001/0026342 A1 * | 10/2001 | Ejiri et al. ....................... | 349/139 |
| 2002/0186339 A1 * | 12/2002 | Hirakata et al. ............... | 349/141 |
| 2003/0063244 A1 * | 4/2003 | Fujimori et al. ............... | 349/113 |
| 2004/0141100 A1 * | 7/2004 | Tsubata et al. .................. | 349/44 |

(Continued)

FOREIGN PATENT DOCUMENTS

| CN | 1410820 A | 4/2003 |
|---|---|---|
| CN | 1637553 A | 7/2005 |

(Continued)

OTHER PUBLICATIONS

Korean Office Action dated Sep. 27, 2007 issued in corresponding Korean Application No. 2006-0092768.

(Continued)

*Primary Examiner* — Michael Caley
(74) *Attorney, Agent, or Firm* — K&L Gates, LLP

(57) ABSTRACT

A liquid crystal display device of the present invention comprises an array substrate 11 equipped with signal lines 33 and scan lines 32 deployed in a matrix arrangement, thin film transistors (TFTs) 34 provided near the intersections of the signal lines 33 and scan lines 32, and pixel electrodes 40 of which one is provided in each of the pixel domains delimited by the signal lines 33 and scan lines 32; a color filter substrate 12 on which are formed color filters 22R to 22B and common electrodes 23; and a liquid crystal layer 13 placed between said two substrates; wherein the pixel electrodes 40 are positioned so as not to overlap the signal lines 33, or not to overlap the scan lines 32, or not to overlap either, when viewed from above, and below the spaces between adjacent pixel electrodes 40, resin black matrices 45 are deployed so as to overlap the pixel electrodes 40 when viewed from above.

5 Claims, 12 Drawing Sheets

(56) References Cited

U.S. PATENT DOCUMENTS

| | | | |
|---|---|---|---|
| 2004/0150763 A1* | 8/2004 | Sakamoto et al. | 349/44 |
| 2005/0088589 A1* | 4/2005 | Edwards et al. | 349/110 |
| 2005/0122451 A1* | 6/2005 | Hong | 349/114 |
| 2005/0128383 A1* | 6/2005 | Kim | 349/106 |

FOREIGN PATENT DOCUMENTS

| | | |
|---|---|---|
| JP | 06-208135 | 7/1994 |
| JP | 10-096963 | 4/1998 |
| JP | 2000-066199 | 3/2000 |
| JP | 2001-066606 | 3/2001 |
| JP | 2001-188256 A | 7/2001 |
| JP | 2001-337349 | 7/2001 |
| JP | 2004-219991 | 4/2011 |
| KR | 0239778 | 1/2000 |
| KR | 2001-0035877 A | 5/2001 |
| KR | 2002-0058713 A | 7/2002 |
| KR | 2002-0060844 | 7/2002 |
| KR | 2003-0025516 A | 3/2003 |
| KR | 2004-0039038 | 5/2005 |

OTHER PUBLICATIONS

Chinese Office Action dated Dec. 28, 2007, issued in corresponding Chinese Patent Application No. 2006101393624.

Korean Office Action dated May 19, 2008, issued in corresponding Korean Patent Application No. 10-2006-0092768.

Japanese Office Action dated Jul. 20, 2010, for corresponding Japanese Patent Application No. 2006-124918.

JP Office Action for corresponding 2006-124918 dated Mar. 8, 2011; 4 pages.

* cited by examiner

Fig. 9
Fig. 9A
Gate electrode
Write period   Hold period
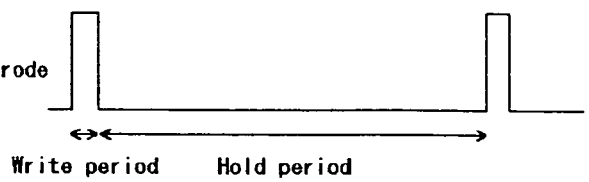
Fig. 9B
$V_{com}$
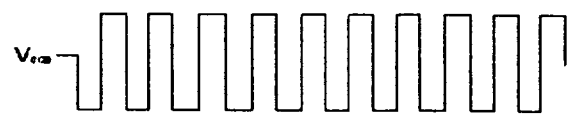
Fig. 9C
Source electrode
Voltage for white display
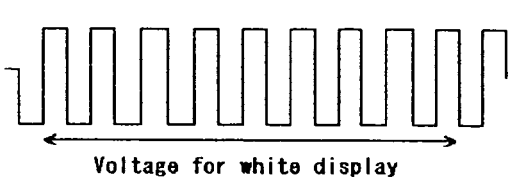
Fig. 9D
Pixel electrode
Fig. 9E
Source electrode
Voltage for   Voltage for   Voltage for
white display  black display  white display
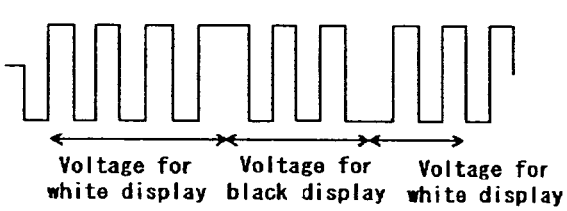
Fig. 9F
Pixel electrode
ΔV
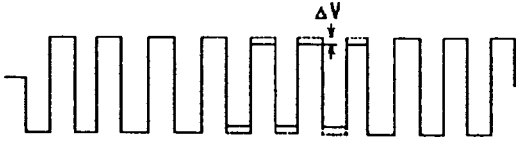

LIQUID CRYSTAL DISPLAY DEVICE INCLUDING A LIGHT-BLOCKING MEMBER

FIELD OF THE INVENTION

The present invention relates to a liquid crystal display device. In particular it relates to a liquid crystal display device in which the electrostatic capacitance generated between the scan lines and signal lines on the one hand, and the pixel electrodes and common electrodes on the other, is reduced, so that display faults are prevented and power consumption is lowered.

BACKGROUND OF THE INVENTION

Over recent times the use of liquid crystal display devices has spread rapidly not only in information and telecommunications equipment but in electronic equipment in general. Since these liquid crystal display devices do not themselves emit light, most such devices in use are of the transmissive type that has a backlight provided at the back of a substrate.

An ordinary transmissive liquid crystal display device of the related art will now be described with reference to FIGS. 5 and 6. FIG. 5 is a schematic plan view showing in close-up a single pixel portion of the related art liquid crystal display device as seen through the color filter substrate, while FIG. 6 is a cross-sectional view on line VI-VI in FIG. 5.

The related art liquid crystal display device 10A of FIGS. 5 and 6 is composed of an array substrate 11, a color filter substrate 12, and a liquid crystal layer 13 provided between those two substrates. The array substrate 11 comprises: a transparent substrate 31 of glass or similar; multiple scan lines 32 and signal lines 33 that are constituted of conductive substances and are arranged in grid form on the surface of the transparent substrate 31; thin film transistors ("TFTs" below) 34 that are provided close to the intersections of the scan lines 32 and signal lines 33 and serve as switching elements; multiple storage capacitor electrodes 36 that are constituted of a conductive substance and are provided between the scan lines 32 so as to be almost parallel with the scan lines 32; a gate insulator 37 that covers the scan lines 32 and the storage capacitor electrodes 36 and is constituted of inorganic insulator; a protective insulator 38 that covers the signal lines 33 and the TFTs 34 and is constituted of inorganic insulator; an interlayer 39 that is provided over the protective insulator 38 and is constituted of organic insulation film; and pixel electrodes 40 constituted of indium tin oxide (ITO) or similar, which are provided over the interlayer 39, and each of which is positioned so as to cover one of the domains corresponding to one pixel that are enclosed by the scan lines 32 and signal lines 33.

The TFTs 34 are each composed of: a source electrode S that branches off from a signal line 33; a gate electrode G that branches off from a scan line 32; a drain electrode D that is connected to the pixel electrode 40; and a silicon layer 35 that is constituted of polysilicon (p-Si), amorphous silicon (a-Si) or the like. The pixel electrode 40 is connected to the drain electrode D via a contact hole 41 provided in the interlayer 39 located over the storage capacitor electrode 36.

The color filter substrate 12 comprises: a transparent substrate 21 constituted of glass or similar; black matrices (not shown in the drawings) that are constituted of chromium metal or similar and are formed as a grid on the surface of the transparent substrate 21; color filters 22R, 22G, 22B constituted of red (R), green (G) and blue (B) etc., each of which is provided in one of the domains delimited by the black matrices; and a common electrode 23 that are constituted of ITO or the like and provided over the color filters 22R, 22G, 22B. To manufacture the liquid crystal display device 10A, the two substrates 11 and 12 are positioned with their surfaces opposing each other, their like outer edges are stuck together by means of seal material (not shown in the drawings), spacers 14 are placed in the resulting interior space, and such space is filled with liquid crystal, thus forming a liquid crystal layer.

Such a liquid crystal display device is for example set forth in Japanese Laid-Open Patent Publication 2001-188256, which includes techniques for rendering the device's aperture ratio higher. One such technique that has long been publicly known, called "field shield pixel" (FSP) or similar term, enlarges the pixel electrode domains in order to raise the aperture ratio, and involves covering the TFTs over with an organic insulative film and flattening the entire surface prior to formation of the pixel electrodes.

FIG. 7 is a cross section on the line VII-VII in FIG. 5. As FIG. 7 shows, in a related art liquid crystal display device 10A the side and end portions of the pixel electrodes 40, each of which covers a domain corresponding to one pixel, are formed so as to overlap the scan lines 32 and signal lines 33 as viewed from above. The purpose of such overlapping of the pixel electrodes 40 with the scan lines 32 and signal lines 33 is to prevent light leakage from such join portions; more precisely, to prevent light leakage from occurring when light from the backlight of the liquid crystal display device 10A passes through the liquid crystal layer at the portions where the orientation of the crystals is disturbed due to the application of voltage at the pixel electrodes' edges. The scan lines 32 and signal lines 33 normally have an identical width $L_1$ which is approximately 8 μm, while the width $L_2$ of the overlaps with the pixel electrodes 40 is approximately 2 μm in each case.

However, if the pixel electrodes are formed over the scan lines and signal lines, certain electrostatic capacitances Csd, Cgd will be present between the scan lines 32 and signal lines 33 on the one hand and the pixel electrodes 40 on the other, as shown in FIG. 7. If such electrostatic capacitances Csd, Cgd exceed a certain level, crosstalk will occur in the display screen when the liquid crystal display device 10A is driven. Crosstalk is particularly liable to occur around black displays which are displayed on a white background. The occurrence mechanism of such crosstalk is thought to be due to reasons such as described below. Namely, FIG. 8 shows a screen in which crosstalk has occurred, in a liquid crystal display device 10A such as shown in FIGS. 5 to 7. In FIG. 8 a black screen is displayed on a white background, with a point within the white background domain being labeled "X" and points within the domains above and below the black screen, that is, lying on the signal lines, labeled "Y". The voltage waveforms at such points X and Y are shown in FIG. 9.

As FIG. 9 shows, when a signal is applied to the gate electrode of a TFT, the TFT is driven and writing into the pixel electrode begins. When this happens, the potential of the pixel electrode is maintained for a certain period by the capacitance of the auxiliary electrode (refer to FIG. 9A). The potential for the white display that is written into the pixel electrode during the write period rises and falls together with the amplitude of the opposing electrode potential Vcom throughout the hold period (refer to FIG. 9B). Observing the waveforms of the voltages applied in this state to the signal lines and pixel electrodes at points X and Y, it can be seen that voltage for the white display is continuously applied to the signal lines at the point X portion up until the next write period comes, and that the potential of the pixel electrodes at such point X portion rises and falls with the same amplitude up until the next write period comes (refer to FIGS. 9C and 9D).

If, mid-way through such process, voltage for a black display is applied to the signal lines at the point Y portion, the amplitude of the pixel electrode's potential at the Y point portion will vary, and will continue to do so for as long as such voltage is applied to such signal lines (refer to FIG. 9E). As a result, the effective value of the voltage applied to the liquid crystals will differ at points X and Y, giving rise to a difference $\Delta V$ which will manifest as a difference in brightness and cause crosstalk to occur (refer to FIG. 9F).

Thus, in a related art liquid crystal display device 10A such as described above there is the problem that crosstalk occurs as a result of the electrostatic capacitance Cgd that arises between the scan lines 32 and pixel electrodes 40 and the electrostatic capacitance Csd that arises between the signal lines 33 and pixel electrodes 40. To resolve this problem, one can increase the capacitance of the capacitor that is constituted by the portion of overlap between the storage capacitor electrode 36 and the drain electrode D of the TFT 34, in other words the storage capacitor that serves as signal hold capacitance for activation of the active matrix, thereby permitting the electrostatic capacitances Cgd and Csd to be ignored. But in order to increase the storage capacitance it will be necessary to enlarge the area of the storage capacitor electrode 36, which will give rise to the further problem of a fall in the aperture ratio of each pixel, since the storage capacitor electrode 36 is composed of a light-blocking conductive substance.

Furthermore, in the related art liquid crystal display device 10A there is also formed an electrostatic capacitance Csc between the signal lines 33 of the array substrate 11 and the common electrode 23 of the color filter substrate 12 when the array substrate 11 and the color filter substrate 12 are superposed on each other. Likewise, an electrostatic capacitance is formed between the scan lines 32 and the common electrodes 23. Terming such capacitance Cgc, the equivalent circuits for a single pixel of the liquid crystal display device 10A may be represented as in FIG. 10.

As FIG. 10 shows, the electrostatic capacitances Csc and Cgc exert an adverse effect on the opposing electrode potential Vcom. More specifically, there exists the problem that electrical power is consumed by these electrostatic capacitances Csc and Cgc, with the result that the power consumption of the liquid crystal display device 10A increases.

Moreover, the TFTs used in the liquid crystal display device have the property that when light is shone on them a faint electric current flows through them. When generated, such faint current causes hindrance of the TFT ON/OFF control. In the related art liquid crystal display devices therefore, black matrices for preventing extraneous light from being shone onto the TFTs are deployed over the color filter substrate so as to overlap the TFTs when viewed from above, with the purpose of preventing light leakage to the TFTs. By such means it is possible to curb to a certain extent the shining of extraneous light onto the TFT, but the fact that black matrices are provided over the color filter substrate means that relatively wide gaps are formed between that substrate and the TFTs, with the result that entry of extraneous light from oblique directions cannot be prevented. A further problem is that light from the backlight will shine onto the black matrices, constituted of chromium metal or the like, where some of such light will be reflected and shone onto the TFTs, resulting in light leakage to the TFTs.

SUMMARY OF THE INVENTION

In view of the foregoing problems, the present inventors conducted many and various investigations into liquid crystal display devices that could prevent light leakage and flicker at the peripheral portions of the scan lines and signal lines, as well as curb to a good degree the generation of electrostatic capacitance between the signal and scan lines and the pixel electrodes; as a result they arrived at the present invention when they discovered that by forming over the signal lines and scan lines resin black matrices that are broader than the signal lines and scan lines it is possible to eliminate the occurrence of light leakage without making the pixel electrodes overlap the scan lines and signal lines, and furthermore the implementation of light blockage between the pixels via the scan lines and signal lines will not be necessary, so that the scan lines and signal lines can be made narrower, which will curb the electrostatic capacitance that arises between the scan and signal lines and the common electrodes.

Thus the purpose of the present invention is to provide a liquid crystal display device that can prevent light leakage from the peripheral portions of the scan lines and signal lines, as well as curb display defects such as crosstalk, and that additionally achieves efficient power consumption.

In order to resolve the aforementioned problems, a first mode of the present invention is a liquid crystal display device having:

a first substrate equipped with signal lines and scan lines deployed in a matrix arrangement, thin film transistors provided near the intersections of said signal lines and scan lines, and pixel electrodes of which one is provided in each of the pixel domains delimited by said signal lines and scan lines;

a second substrate on which are formed color filters and common electrodes;

and a liquid crystal layer placed between said two substrates;

and with the features that said pixel electrodes are positioned so as not to overlap said signal lines, or not to overlap said scan lines, or not to overlap either, when viewed from above; and below the spaces between adjacent said pixel electrodes, resin black matrices are deployed so as to overlap said pixel electrodes when viewed from above.

Another feature of the liquid crystal display device of the aforementioned first mode is that the width of said signal lines or said scan lines, or both, is 3 to 5 µm, and the width of said resin black matrices 6 to 10 µm.

A further feature of the liquid crystal display device of the aforementioned first mode is that said resin black matrices are embedded in an interlayer that is provided above said signal lines and scan lines and below the spaces between said pixel electrodes.

A still further feature of the liquid crystal display device of the aforementioned first mode is that said resin black matrices are also provided over said thin film transistors.

A yet further feature of the liquid crystal display device of the aforementioned first mode is that an interlayer is provided below said pixel electrodes, and a reflective film is provided in at least part of the space between said pixel electrodes and said interlayer.

A second mode of the present invention is a liquid crystal display device having:

a first substrate equipped with signal lines and scan lines deployed in a matrix arrangement, thin film transistors provided near the intersections of said signal lines and scan lines, and pixel electrodes of which one is provided in each of the pixel domains delimited by said signal lines and scan lines;

a second substrate on which are formed color filters and common electrodes;

and a liquid crystal layer placed between said two substrates;

and with the features that said pixel electrodes are positioned so as not to overlap said signal lines, or not to overlap said scan lines, or not to overlap either, when viewed from above; and below the spaces between adjacent said pixel electrodes, insulative light-blocking members are deployed so as to overlap said pixel electrodes when viewed from above.

Another feature of the liquid crystal display device of the aforementioned second mode is that said light-blocking members are also provided over said thin film transistors.

A further feature of the liquid crystal display device of the aforementioned second mode is that black matrices are formed on said color filter substrate so as to correspond to said pixel domains.

A still further feature of the liquid crystal display device of the aforementioned second mode is that said insulative light-blocking members are composed of material that is different from that of said color filter substrate's black matrices.

A third mode of the present invention is a liquid crystal display device having:

a first substrate equipped with signal lines and scan lines deployed in a matrix arrangement, thin film transistors provided near the intersections of said signal lines and scan lines, an interlayer that covers said thin film transistors, and pixel electrodes which lie over said interlayer and of which one is provided in each of the pixel domains delimited by said signal lines and scan lines;

a second substrate on which are formed color filters and common electrodes;

and a liquid crystal layer placed between said two substrates;

and with the features that said pixel electrodes are positioned so as not to overlap said signal lines, or not to overlap said scan lines, or not to overlap either, when viewed from above; and below the spaces between adjacent said pixel electrodes, insulative light-blocking members are provided so as to extend from the edges of said signal lines or scan lines to the edges of said pixel electrodes.

Another feature of the liquid crystal display device of the aforementioned third mode is that said light-blocking members are also provided over said thin film transistors.

A further feature of the liquid crystal display device of the aforementioned third mode is that black matrices are formed on said color filter substrate so as to correspond to said pixel domains.

A still further feature of the liquid crystal display device of the aforementioned third mode is that said insulative light-blocking members are composed of material that is different from that of said color filter substrate's black matrices.

Thanks to possessing the structure above, the present invention yields outstanding effects that will now be described. Namely, although according to each of the modes of the present invention the pixel electrodes are positioned so as not to overlap the signal lines and scan lines, there will occur no light leakage between the pixel electrodes since resin black matrices or insulative light-blocking members are formed below the spaces between the adjacent pixel electrodes so as to overlap the pixel electrodes. That is, whereas in the related art liquid crystal display devices the signal lines and pixel electrodes are made to overlap so that light will not leak at the peripheral portions of the signal lines, etc., and light is thereby prevented from being reflected by the disturbed-orientation liquid crystals that occur at the end portions of the pixel electrodes, in the present invention the light-blocking is satisfactorily effected by means of resin black matrices or insulative light-blocking members instead of the signal lines and scan lines, so that there is no need to form the pixel electrodes so as to overlap the signal lines and scan lines viewed from above. By such means it is possible to curb electrostatic capacitance to a good degree, in particular the electrostatic capacitance Csd that arises between the pixel electrodes and the signal lines, which is the electrostatic capacitance that causes crosstalk to occur. As a result, crosstalk and other display defects can be curbed without enlarging the area of the storage capacitor electrodes which constitute the storage capacitor that serves as signal hold capacitance. Further, the fact that such electrostatic capacitance can be curbed means that the electrical power that such electrostatic capacitance consumes can also be curbed, so that a liquid crystal display device with reduced power consumption can be provided. The fact that various signals are applied to the signal lines means that the electrostatic capacitance Csd arising between the signal lines and the pixel electrodes will tend to be greater than that arising between the scan lines and the pixel electrodes. Therefore, the resin black matrices should be provided over the signal lines at least. This is because the scan lines are solely for supplying ON/OFF signals to the TFTs and therefore have capacitance that is not particularly large. If however the resin black matrices are also provided over the scan lines, then display defects will not arise there either, and moreover it will be possible to reduce electrostatic capacitance between the scan lines and pixel electrodes and between the scan lines and common electrodes, thus permitting realization of a liquid crystal display device with even lower power consumption.

In the aforementioned first mode the signal lines and scan lines, which in the related art required a width of 8 μm in order to assure light blockage, no longer need to be light-blocking, and consequently may be made narrower, with a width of 3 to 5 μm, preferably 4 μm. As an inevitable result, the electrostatic capacitance occurring between such narrowed signal and scan lines on the one hand and the common electrodes on the other will be lessened, which will enable realization of a liquid crystal display device with even higher-efficiency power consumption. Further, the signal lines' and scan lines' role of blocking light between the pixel electrodes is taken over by the resin black matrices, whose width will be from 6 to 10 μm, preferably 8 μm identical with the width of the related art signal and scan lines, so that there will be no risk of the light blockage being inferior to the related art level.

In the aforementioned first mode the fact that the resin black matrices are embedded inside the interlayer permits the thickness of the interlayer to be the same as in the related art, so that there is no risk that the liquid crystal display device itself will be thick. Further, being thus surrounded with organic or inorganic insulative film, the resin black matrices will not be subject to any adverse electrical charge effects from the various lines.

In each of the aforementioned modes the provision of resin black matrices or light-blocking members between the pixel electrodes curbs light leakage, etc., on the wiring lines, and if resin black matrices or light-blocking members are also provided on the TFs, then light leakage to the TFTs can also be reliably prevented. More precisely, the distance between the black matrices and the TFTs will be extremely small compared to when the black matrices are provided over the color filter substrate as in the related art; hence there will be almost no entry of extraneous light from oblique directions, and almost no light from the backlight will be shone onto the TFTs via reflection at the resin black matrices. This will make it possible to curb the occurrence of flicker to a good degree. The resin black matrices or light-blocking members provided over the TFTs can use the same materials as the resin black matrices or light-blocking members described earlier, and in that case will preferably be formed in the same process as the resin black matrices or light-blocking members provided between the pixel electrodes, since this will obviate an increase in manufacturing processes.

The liquid crystal display device of the aforementioned first mode is not limited to being of the transmissive type; it could for example be a semitransmissive liquid crystal display device if a reflective film is formed over the light-blocking portions, where the storage capacitor electrode and TFT, etc., are formed, within each pixel domain, or it could be a reflective liquid crystal display device if a reflective film is formed over the whole of each pixel domain. In any of these cases the liquid crystal display device that is provided will have high-efficiency power consumption and curbed display defects, thanks to possessing the foregoing structure.

BRIEF DESCRIPTION OF THE DRAWINGS

FIG. 9 is a set of graphs illustrating the voltage waveforms at various points in a liquid crystal display device when crosstalk occurs.

DETAILED DESCRIPTION OF THE PREFERRED EMBODIMENTS

Preferred embodiments of the present invention will now be described with reference to the drawings. It should however be understood that the embodiments below represent merely illustrative instances of liquid crystal display devices for realizing the technical thought of the present invention; these embodiments are not intended to limit the present invention to these particular liquid crystal display devices. Adaptations could yield other embodiments equally valid within the scope of the claims.

Embodiment 1

Figure 1:
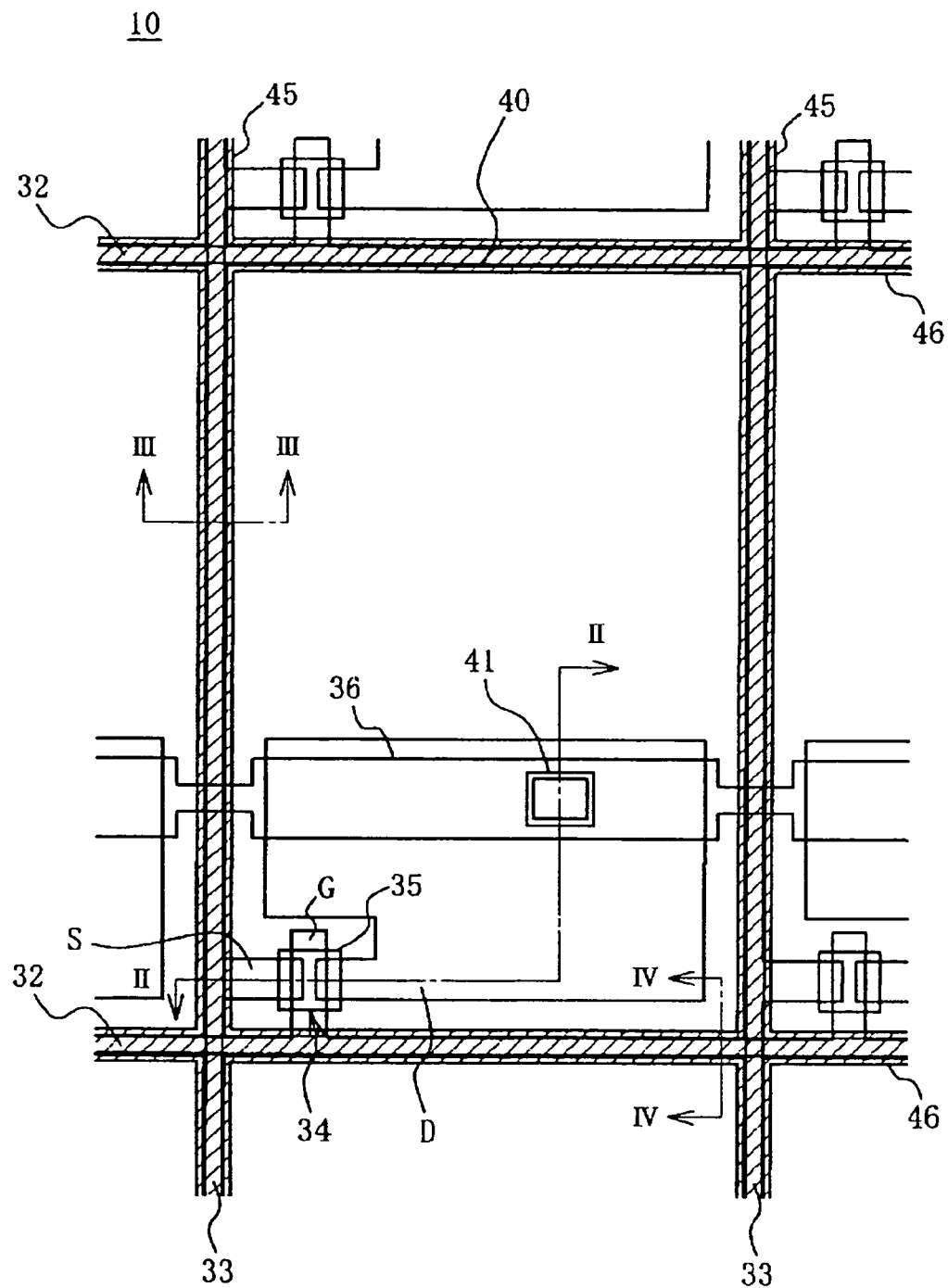
FIG. 1 is a schematic plan view illustrating in close-up a single pixel portion of the liquid crystal display device of an embodiment of the present invention as seen through the color filter substrate.
Figure 2:
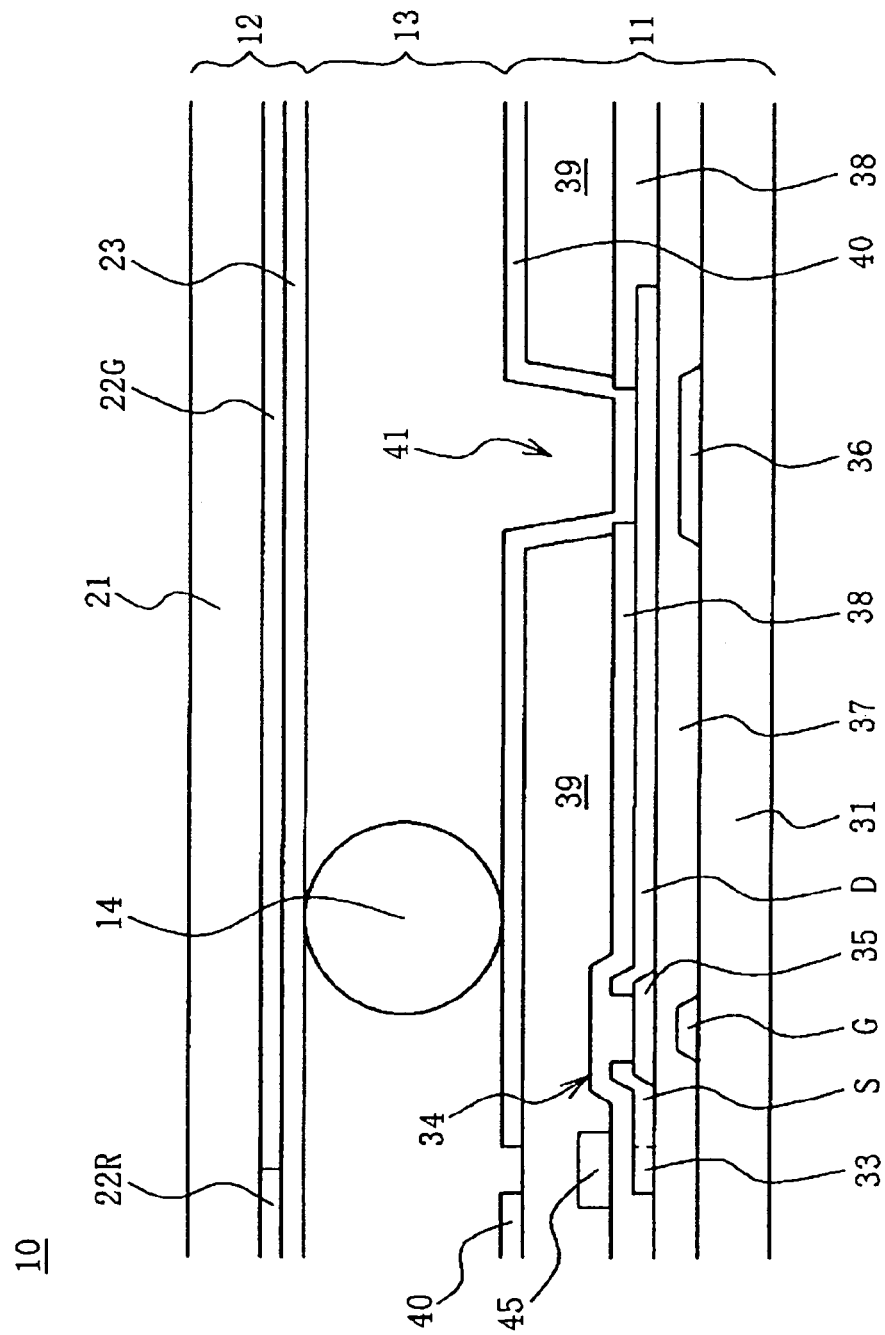
FIG. 2 is a cross-sectional view along line II-II in FIG. 1.
Figure 3:
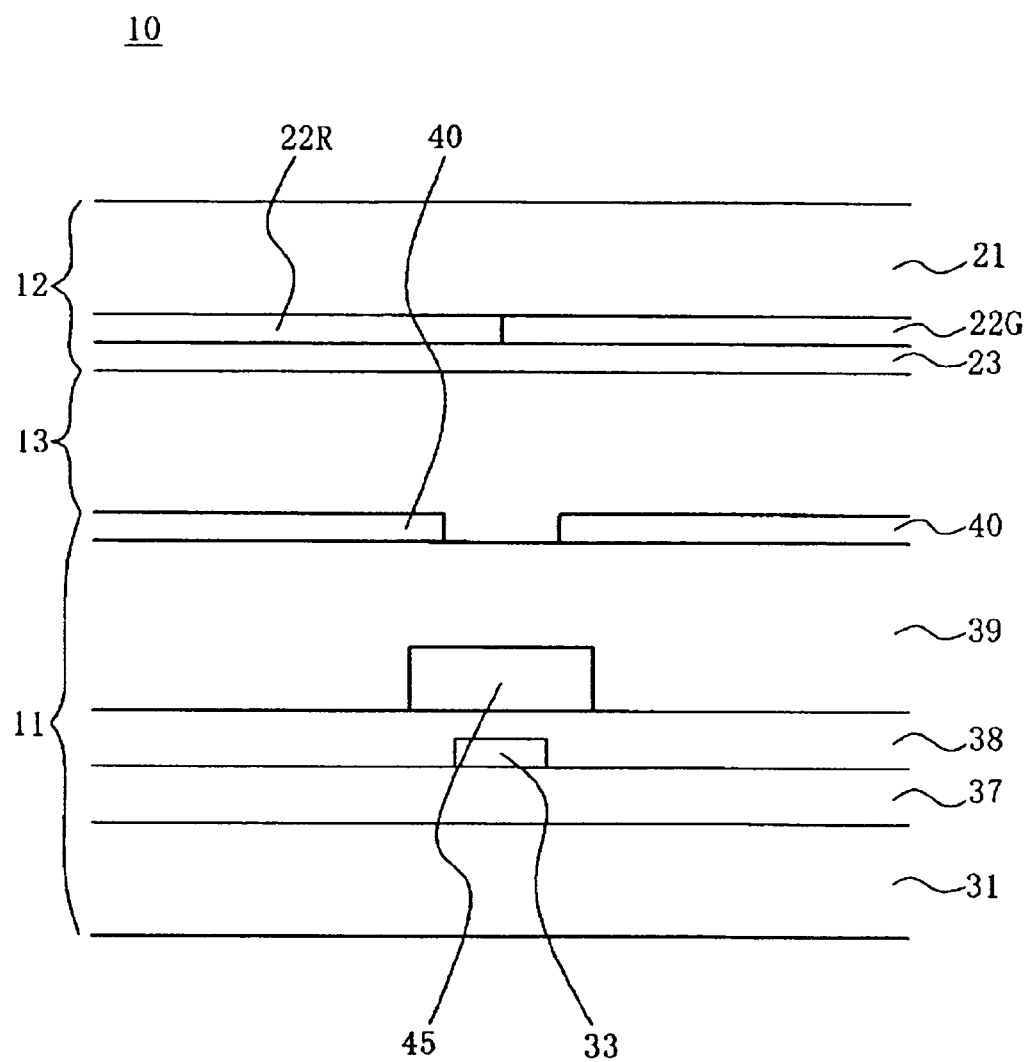
FIG. 3 is a cross-sectional view along line III-III in FIG. 1.
Figure 4:
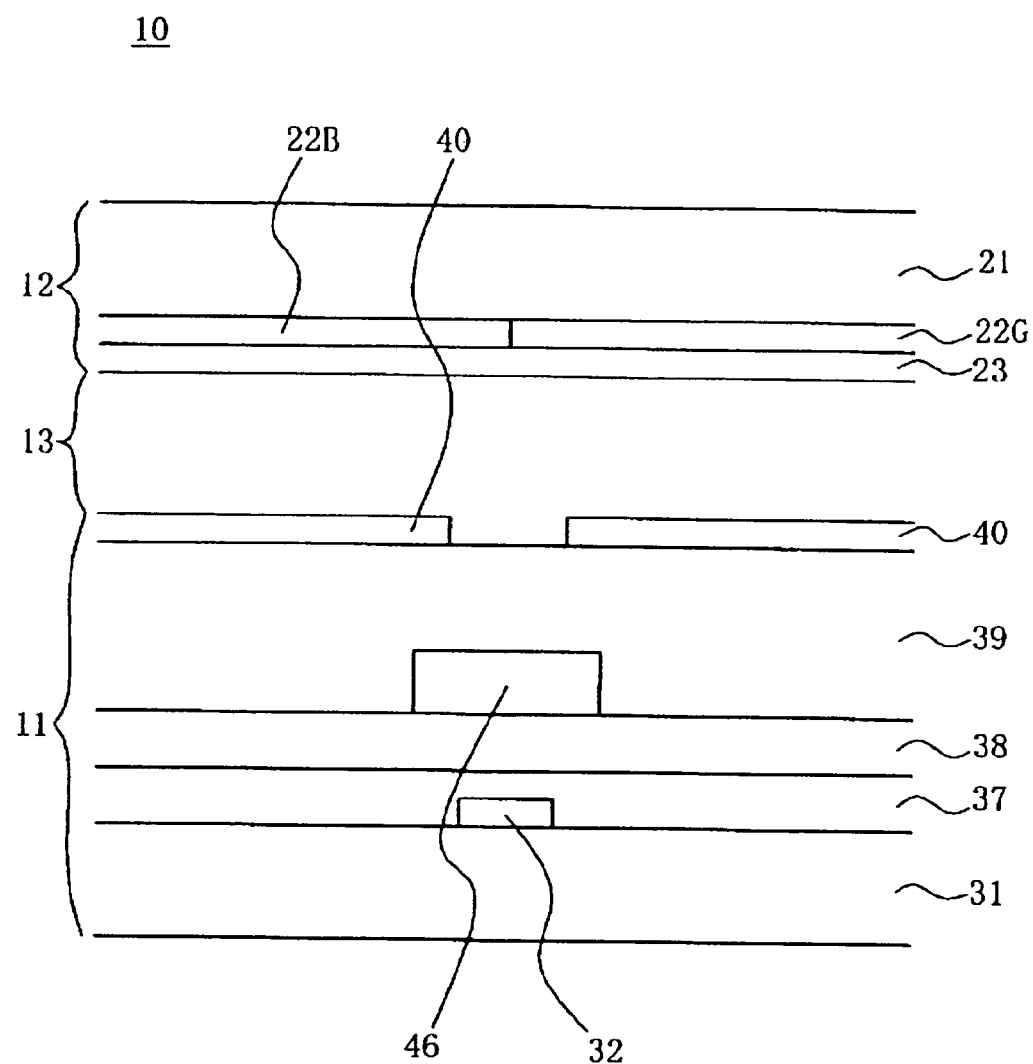
FIG. 4 is a cross-sectional view along line IV-IV in FIG. 1.
Figure 5:
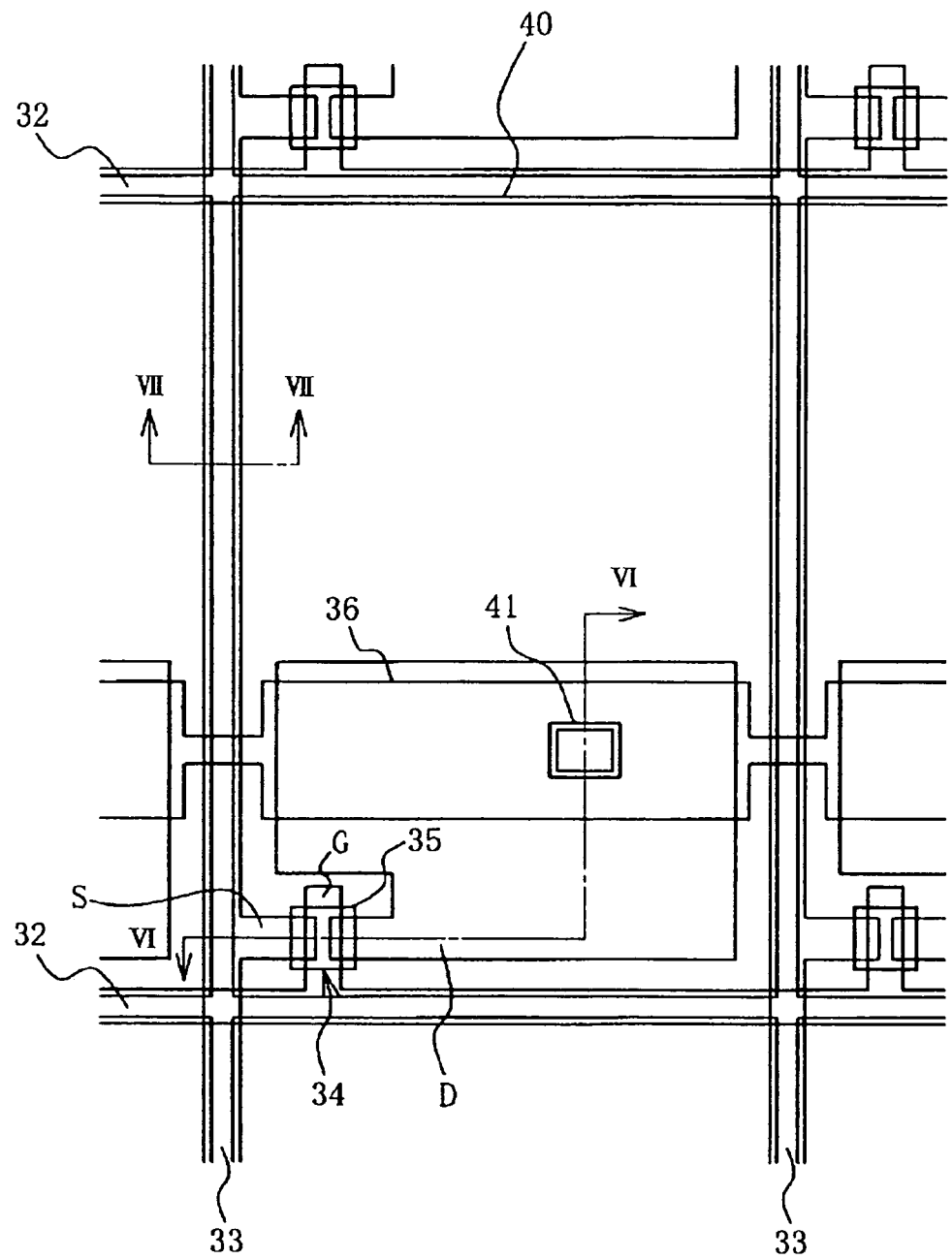
FIG. 5 is a schematic plan view illustrating in close-up a single pixel portion of a related art liquid crystal display device as seen through the color filter substrate.
Figure 6:
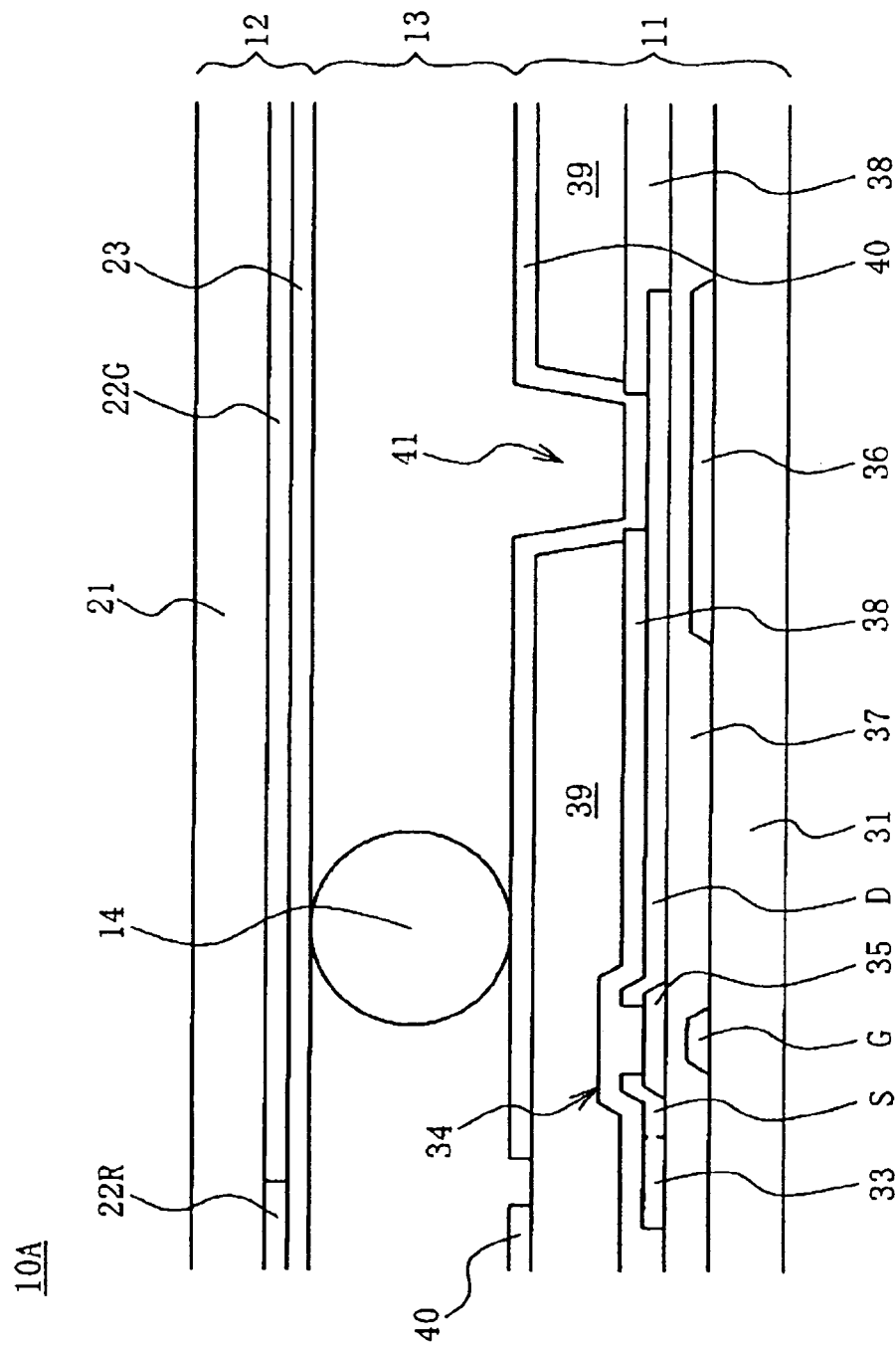
FIG. 6 is a cross-sectional view along line VI-VI in FIG. 5.
Figure 7:
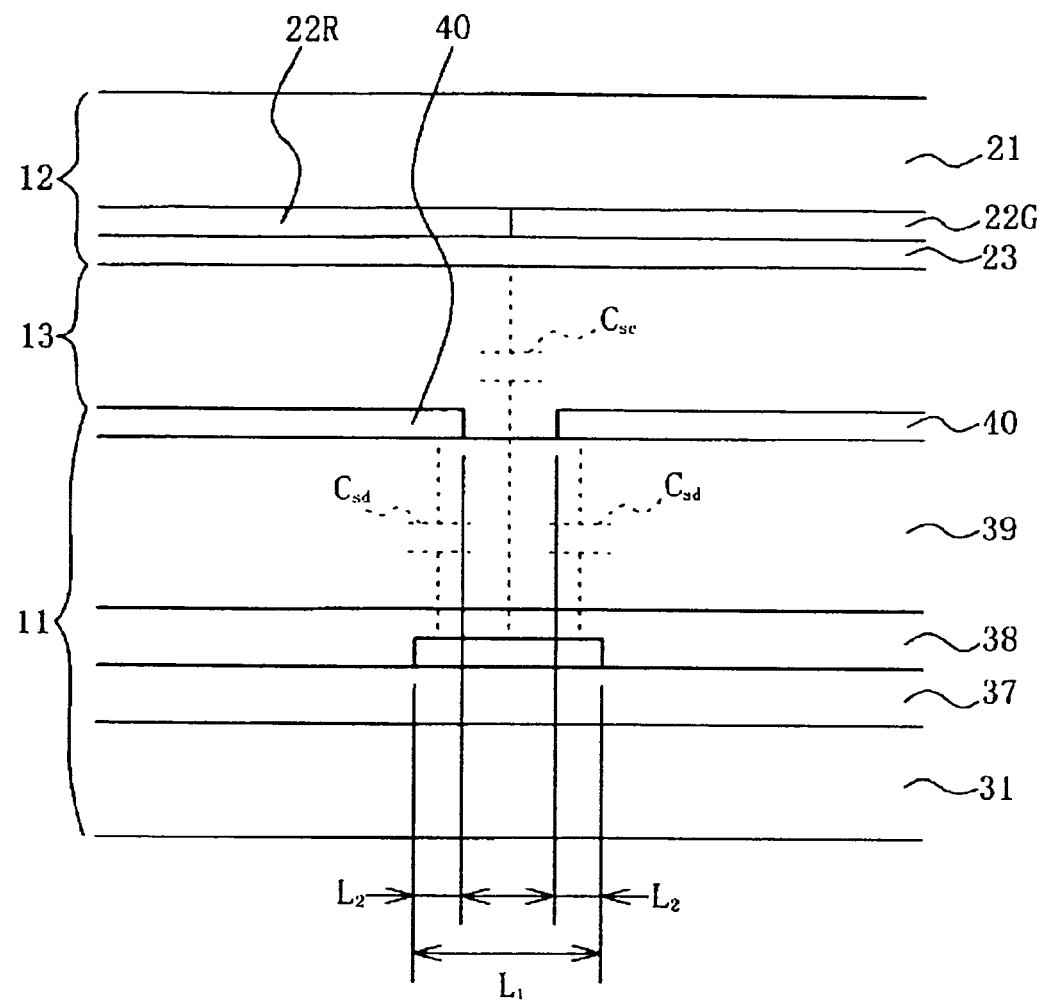
FIG. 7 is a cross-sectional view along line VII-VII in FIG. 5.
Figure 8:
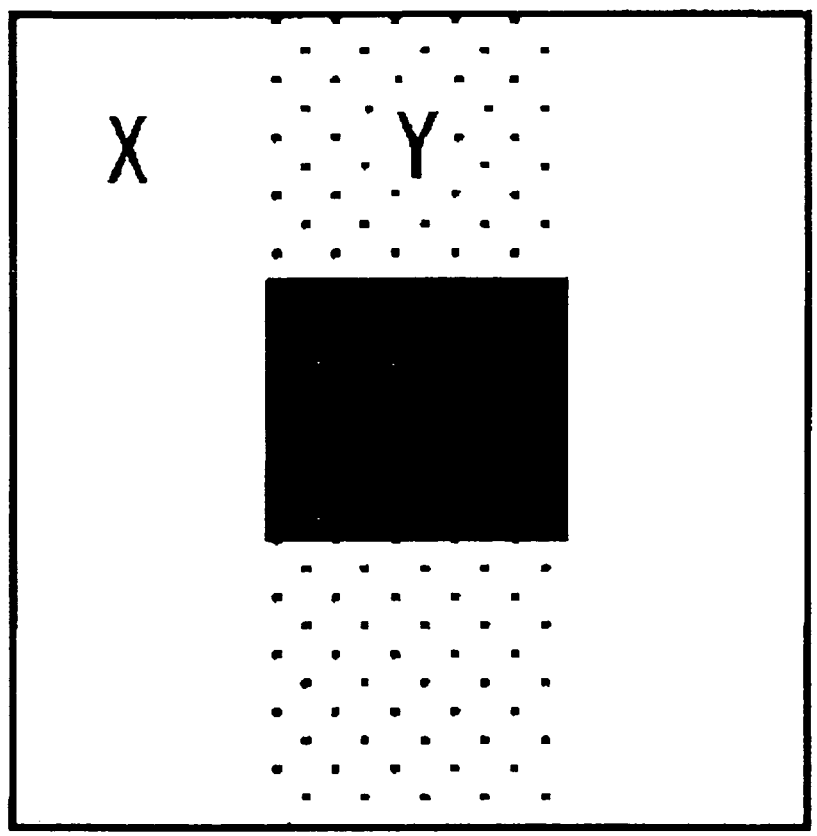
FIG. 8 illustrates a screen in which crosstalk has occurred.

FIG. 1 is a schematic plan view illustrating in close-up a single pixel portion of the liquid crystal display device of an embodiment of the present invention as seen through the color filter substrate; FIG. 2 is a cross-sectional view along line II-II in FIG. 1; FIG. 3 is a cross-sectional view along line III-III in FIG. 1; and FIG. 4 is a cross-sectional view along line IV-IV in FIG. 1. Those parts of the liquid crystal display device 10 described below that are structurally similar to the corresponding parts of the related art liquid crystal display device 10A are assigned the same reference numerals.

As shown in FIGS. 1 and 2, a liquid crystal display device 10 of the present invention is composed of an array substrate 11, a color filter substrate 12, and a liquid crystal layer 13 provided between those two substrates. The array substrate 11 comprises:

a transparent substrate 31 of glass or similar;

multiple scan lines 32 and signal lines 33 that are constituted of a conducting substance and are arranged in grid form on the surface of the transparent substrate 31;

TFTs 34 that are provided close to the intersections of the scan lines 32 and signal lines 33 and serve as switching elements;

multiple storage capacitor electrodes 36 that are constituted of a conductive substance and are provided between the scan lines 32 so as to be almost parallel with the scan lines 32;

a gate insulator 37 that is constituted of inorganic insulator and covers the scan lines 32 and the storage capacitor electrodes 36;

a protective insulator 38 that is constituted of inorganic insulator and covers the signal lines 33 and the TFTs 34;

an interlayer 39 that is constituted of organic insulation film and is provided over the protective insulator 38;

pixel electrodes 40 constituted of ITO or similar which are provided over the interlayer 39, and each of which is positioned so as to cover one of the domains corresponding to one pixel that are enclosed by the scan lines 32 and signal lines 33; and resin black matrices 45, 46 that are embedded into the interlayer 39 over the scan lines 32 and signal lines 33.

The TFTs 34 are each composed of:

a source electrode S that branches off from a signal line 33;

a gate electrode G that branches off from a scan line 32;

a drain electrode D that is connected to a pixel electrode 40; and a silicon layer 35 that is constituted of polysilicon (p-Si), amorphous silicon (a-Si) or the like;

the pixel electrode 40 being connected to the drain electrode D via a contact hole 41 provided in the interlayer 39 located over the storage capacitor electrode 36.

In FIG. 1 the hatched portions are the resin black matrices 45, 46, which are constituted of resin material possessing light-blocking ability and are formed in grids so as to align with the scan lines 32 and signal lines 33, the signal line resin black matrix 45 being formed over the signal lines 33 and the scan line resin black matrix 46 being formed over the scan lines 32. In the present embodiment the widths of the scan lines 32 and signal lines 33 are equal, which means that the resin black matrices 45, 46 will also have equal width, preferably 6 to 10 µm, more preferably 8 µm, while the width of the scan lines 32 and signal lines 33 will preferably be 3 to 5 µm, more preferably 4 µm.

The color filter substrate 12 is composed of: a transparent substrate 21 constituted of glass or similar; black matrices (not shown in the drawings) that are constituted of chromium metal or similar and are formed in a grid on the surface of the transparent substrate 21; color filters 22R, 22G, 22B constituted of red (R), green (G) and blue (B) etc., each of which is provided in one of the domains delimited by the black matrices; and common electrode 23 that are constituted of ITO or the like and provided over the color filters 22R, 22G, 22B. To manufacture the liquid crystal display device 10, the two substrates 11 and 12 are positioned with their surfaces opposing each other, their like outer edges are stuck together by means of seal material (not shown in the drawings), spacers 14 are placed in the resulting interior space, and such space is filled with liquid crystal, thus forming a liquid crystal layer.

Next, the manufacturing process for the array substrate 11 of the liquid crystal display device 10 of the present invention will be described.

First of all, a film of a conductive substance constituted of aluminum, molybdenum, chromium or an alloy of these is formed with a particular thickness on the transparent substrate 31. Then by means of patterning using a publicly-known photolithographic method, parts of such film are etched away so as to form multiple scan lines 32 of width 4 μm that extend in the horizontal direction, and storage capacitor electrodes 36 in between the multiple scan lines 32. These storage capacitor electrodes 36 are of what is called the Cs On Common type, whereby adjacent electrodes are linked by narrow linking wires.

Next, a gate insulator 37 of a particular thickness is formed so as to cover the transparent substrate 31, on which the scan lines 32 and storage capacitor electrodes 36 were formed in the above process. For this gate insulator 37, a transparent resin material constituted of silicon nitride or similar will be used. Then a semiconductor layer of for example a-Si is formed over the gate insulator 37. Following that, the a-Si layer is etched away, leaving portions that will cover the gate electrodes G to be projected from the scanning lines 32, and thus is formed a silicon layer 35 that will serve as part of the TFTs 34. Next, using methods similar to the foregoing, there are formed multiple signal lines 33 of width 4 μm in a direction orthogonal to the scan lines 32, source electrodes S that project from the signal lines 33 and are connected to the silicone layer 35, and drain electrodes D which cover over the storage capacitor electrodes 36 and of which one edge is connected to the silicone layer 35. As a result, TFTs 34 that will serve as switching elements are formed close to the intersections of the transparent substrate 31's scan lines 32 and signal lines 33. Further, a protective insulator 38 for surface stabilization, around 0.1 to 0.5 μm thick and constituted of inorganic insulative material, is formed over the transparent substrate 31 so as to cover the various wiring lines, by means of the CVD method.

Next, resin black matrices 45, 46 are formed above the scan lines 32 and signal lines 33 so as to cover the scan lines 32 and signal lines 33. The resin black matrices 45, 46 have a width of 8 μm and are formed so that the scan lines 32 and signal lines 33, being located below the resin black matrices 45, 46, will be invisible from above (refer to FIGS. 3 and 4).

Following the above, an interlayer 39, constituted of organic insulative material, for flattening the surface of the array substrate 11 is formed over the whole surface of that substrate by means of the spin coating method. The interlayer 39 is roughly 2.0 to 3.0 μm thick at the thickest places.

In this forming stage, the interlayer 39 is formed so that the resin black matrices 45, 46 become embedded in the interior thereof. Furthermore, in the portions of the interlayer 39 that are located above the storage capacitor electrodes 36 there are provided contact holes 41 for electrically connecting the pixel electrodes 40 to be described later to the drain electrodes D. The position of these holes is not limited to being above the storage capacitor electrodes 36. However, when the array substrate 11 and the color filter substrate 12 are stuck together to produce the liquid crystal display device 10, the distance between the two substrates will be different at the portions where the contact holes 41 are formed from what it is at the other portions, and this poses hazard of unevenness in the display quality. Accordingly, the holes will preferably be provided over the storage capacitor electrodes 36, which are of a light-blocking material.

Next, a pixel electrode 40 constituted of, for example, ITO is formed in each of the pixel domains enclosed by the scan lines 32 and signal lines 33. The outer edges of each pixel electrode 40 are positioned so as not to overlap the adjacent scan lines 32 or signal lines 33 when viewed from above, and moreover so as to lie over the resin black matrices 45, 46. With the foregoing processes, manufacture of the array substrate 11 is complete.

Thus, according to the liquid crystal display device 10 of the present invention, thanks to the fact that the outer edges of the pixel electrodes 40 are formed so as to overlap the resin black matrices 45, 46, without overlapping the scan lines 32 and signal lines 33 viewed from above, good light-blocking ability can be secured from the resin black matrices 45, 46, and the capacitance of the electrostatic capacitors that are produced between the scan lines 32 and signal lines 33 on the one hand, and the pixel electrodes on the other, can be lessened.

Figure 10:
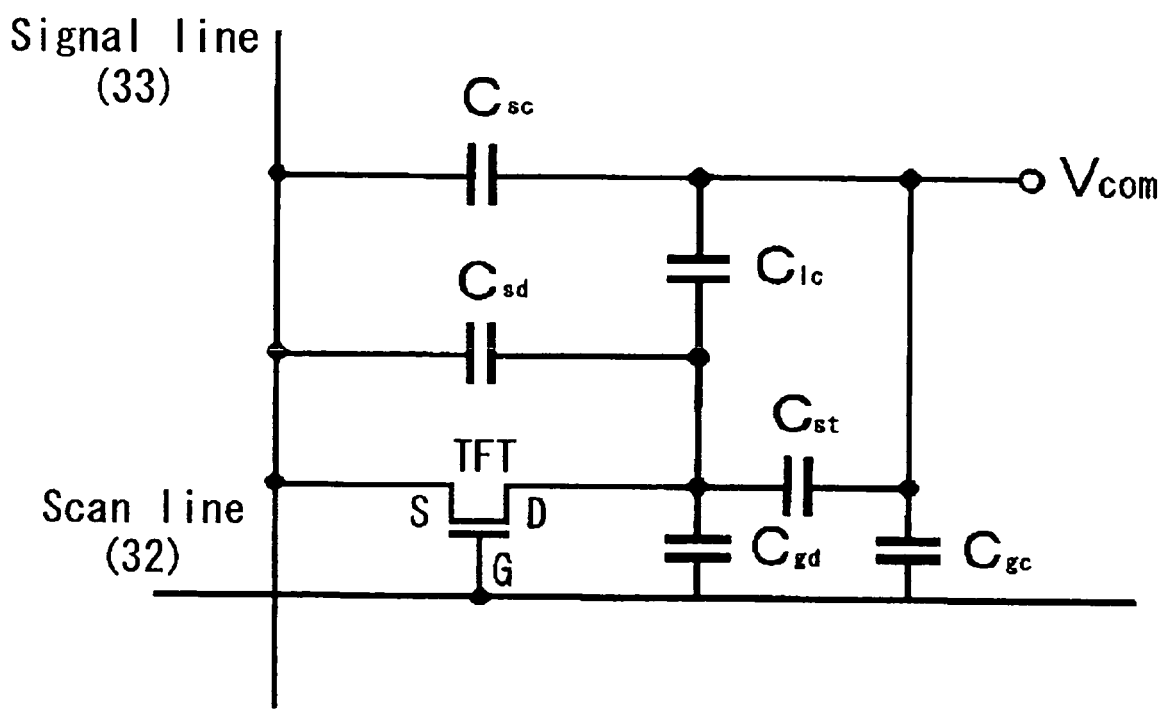
FIG. 10 is a diagram illustrating the equivalent circuits of a single pixel portion of a related art liquid crystal display device.

In addition, the scan lines 32 and signal lines 33 can be formed without consideration for light-blocking ability, and therefore can be of smaller width, for example 4 μm, instead of the 8 μm or so in the related art. Because of this it is also possible to reduce the capacitance of the electrostatic capacitors Csc, Cgc (refer to FIG. 10) which take as electrodes the scan lines 32, signal lines 33, and common electrode 23. Thus, the electrical power that such electrostatic capacitance would otherwise consume will be saved, and the liquid crystal display device 10 will operate with highly efficient power consumption.

Moreover, although in the foregoing embodiment the resin black matrices are provided only between adjacent pixel electrodes, or more precisely, above the signal lines and scan lines, it will be preferable to provide resin black matrices over the TFTs as well, since this will permit the occurrence of flicker due to light leakage to the TFTs to be curbed to a good degree. Where it is desired also to provide resin black matrices over the TFTs in this way, such should be provided simultaneously with the process that forms the resin black matrices over the signal lines and scan lines. This point will be discussed in more detail under embodiment 2.

Embodiment 2

Figure 11:
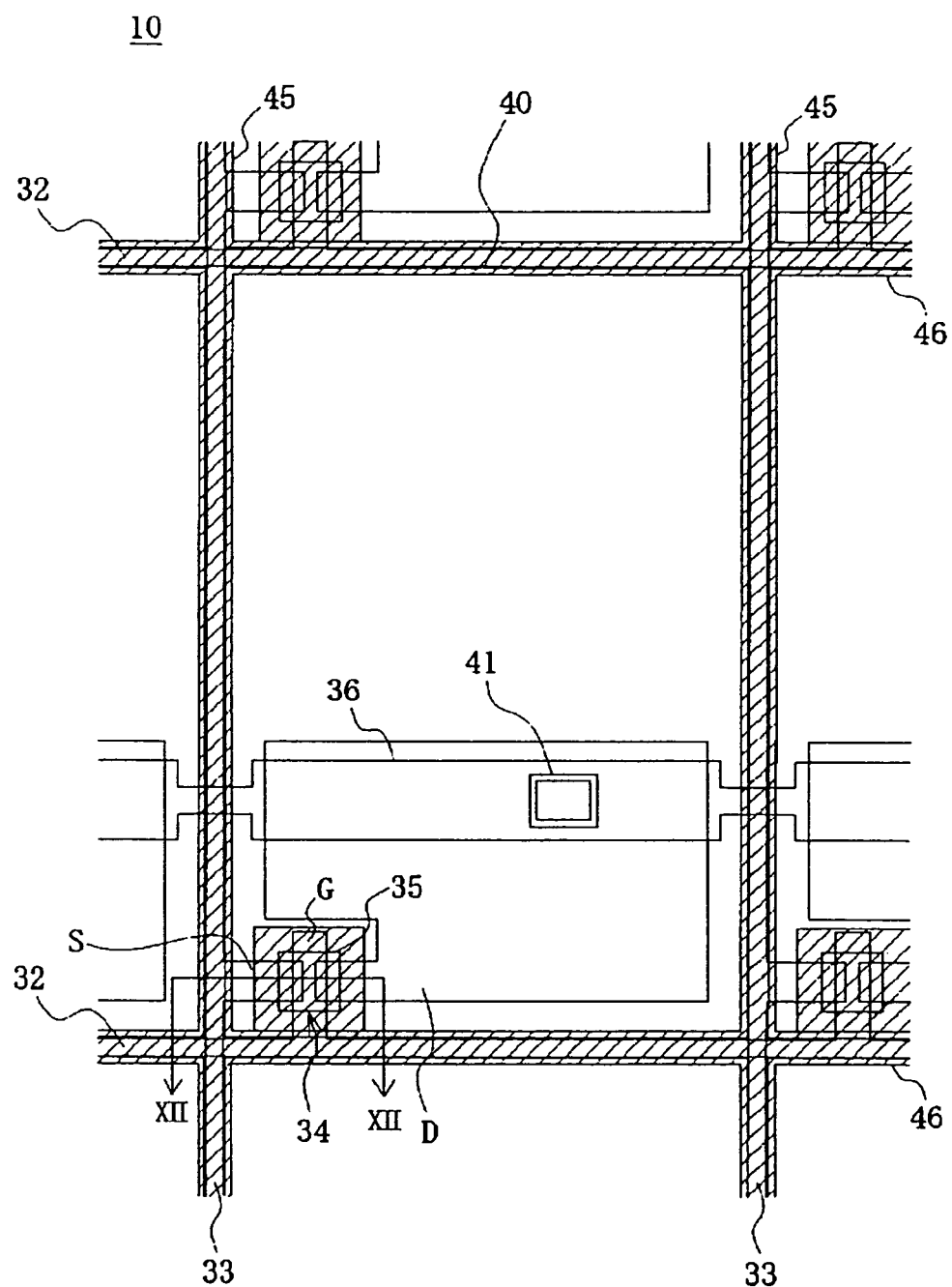
FIG. 11 is a schematic plan view illustrating in close-up a single pixel portion of the liquid crystal display device of another embodiment of the present invention as seen through the color filter substrate.
Figure 12:
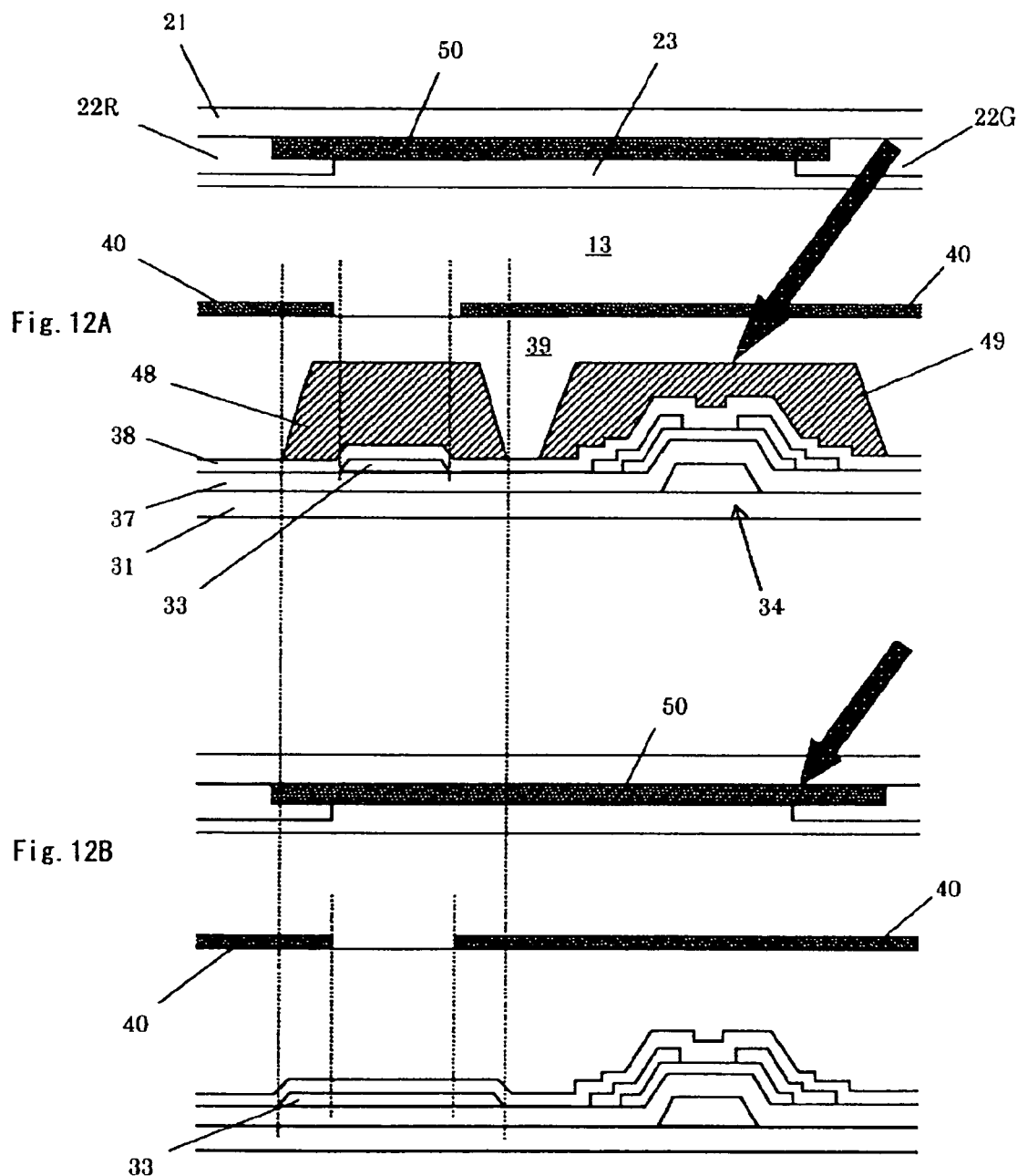
FIG. 12A is a cross-sectional view along line XII-XII in FIG. 11.
FIG. 12B is a cross-sectional view through a related art liquid crystal display device.

FIG. 11 is a schematic plan view illustrating in close-up a single pixel portion of the liquid crystal display device of another embodiment of the present invention as seen through the color filter substrate, while FIG. 12A is a cross-sectional view through the liquid crystal display device of such embodiment of the present invention. Items in embodiment 2 that are the same as those in embodiment 1 are assigned the identical reference numerals. FIG. This cross-sectional view represents a cross-section through the position of a signal line 33 and the position of a TFT 34, being cut along the line XII-XII in FIG. 11. 12B provides, for the purpose of comparison with embodiment 2, a cross-sectional view through a related art liquid crystal display device at similar positions to those of FIG. 12A.

In embodiment 2, as in embodiment 1, the signal lines 33 and pixel electrodes 40 are deployed so as not to overlap each other when viewed from above, and below the pixel electrodes 40 there are provided insulative light-blocking members 48 extending from the edges of the signal lines 33 to the edges of the pixel electrodes 40. Whereas the black matrices 50 on the color filter substrate 12 side were not shown in the drawings for embodiment 1, the drawings for embodiment 2 show such black matrices 50, which are formed so as to overlap the scan lines 32 and signal lines 33 when viewed from above.

The insulative light-blocking members 48 might be items similar to the resin black matrices 45 of embodiment 1, and it would be permissible for the insulant to be of a substance such as oxide provided that such had light-blocking ability. But in consideration of the manufacturing and processing aspects, these items will preferably be made of resin.

Specifically, the insulative light-blocking members 48 will be of an ordinary resin material into which carbon particles coated with acrylic are mixed. Being insulative, these members will preferably have rather high resistance, specifically of $10^{13}$ Ω·cm or higher. The members' permittivity will preferably be low; for the sake of reducing unneeded capacitance the permittivity will preferably be no more than 14 F/m, or more preferably, no more than 10 F/m.

The insulative light-blocking members 48 and the color filter substrate 12 side black matrices 50 are both required to be light-blocking, but are composed of differing materials. The insulative light-blocking members 48 will preferably have light-blocking ability that is as great as possible, but need not necessarily have light-blocking ability on a par with the color filter substrate 12 side black matrices 50. Normally it will be only or mainly the light-blocking ability of the color filter substrate 12 side black matrices 50 that needs to be considered, as these matrices will be provided more on the transparent substrate 21 side than the common electrodes 23, which are formed densely over the entire substrate. Thus, the black matrices 50 will generally be formed by applying a film of chromium metal or similar using the sputtering method. Despite being extremely thin at around 500 Å, these black matrices 50 have extremely great light-blocking ability and thereby prevent, etc., mixing of adjacent hues. The insulative light-blocking members 48, on the other hand, are located between the signal lines 33 and pixel electrodes 40, and as previously mentioned, will preferably have not only light-blocking ability but also high resistance together with low permittivity. Thus, for these members the characteristics of their material are more important than for the black matrices 50, and it will be permissible for the light-blocking ability of such material to be inferior to that of the black matrices 50.

As in embodiment 1, the light-blocking members 48 are formed via the spin coating method and patterned into a particular shape. More specifically, in the related art panel shown in FIG. 12B for reference, the light-blocking members 48 are provided not only at the portions where the signal lines and pixel electrodes overlap, but also at the portions above the signal lines 33. Thus, with the present embodiment there is a drastic reduction in the capacitance that was inevitably generated in the related art at the portions where the signal lines and pixel electrodes overlapped in order to block light, and light leakage near the edge portions of the pixel electrodes, which in the related art was prevented by means of the overlapping between the signal lines and pixel electrodes, can be prevented by means of the light-blocking members 48.

Being constituted of resin, the light-blocking members 48 can easily be formed so as to be thick. With a thickness of approximately 1.0 to 1.5 μm, it will be possible also to block effectively the light from the backlight that incidents from oblique directions. Then it will be possible to form the pixel electrodes 40 over the interlayer 39, which will be formed with a thickness of approximately 2.0 to 3.0 μm so as to cover the thickly-formed light-blocking members 48 and also to render flat the surface of the array substrate 12, by means of which an increase can be effected in the aperture ratio. Particularly if the light-blocking members 48 are formed to be thick on the array substrate 12 side, it will be possible to block effectively on the array substrate 12 side the oblique-direction light from the backlight and hence there will be little need for concern about light leakage from the backlight on the array substrate 12 side. Neither will there be need for concern about backlight light leakage from the array substrate 12 side as regards the color filter substrate 11 side black matrices 50. This means that those black matrices 50 can be made thin, with the result that a further improvement in the aperture ratio can be effected.

According to the above description the light-blocking members 48 are covered over by the interlayer 39, but alternatively pixel electrodes might be formed over the light-blocking members 48, instead of providing the interlayer 39 here. However, the interlayer 39, which is constituted of organic insulation film, has permittivity ϵ of around 4 F/m, whereas the light-blocking members 48 have permittivity that is higher than this. Consequently the structure whereby the light-blocking members 48 are covered over by the interlayer 39 will be more preferable in order to effect a reduction, albeit small, in the unneeded capacitance.

In embodiment 2, light-blocking members 49 are provided over the TFTs 34. These light-blocking members 49 are provided using the same materials and in the same process as the light-blocking members 48. By thus providing light-blocking members 49 over the TFTs also, extraneous light incidenting from oblique directions (indicated by arrows in the drawings) can be blocked by the light-blocking members 49, as can light from the backlight that is reflected by the color filter substrate 12 side black matrices 50, which are constituted of chromium metal or the like. Thus, none of such light will be shone onto the TFTs 34, and light leakage to the TFTs can be prevented. Furthermore, whereas with the related art it was to a certain extent necessary to form the color filter substrate 12 side black matrices 50 so as to cover the TFTs 34 with a fairly broad margin in order to block extraneous light from oblique directions, in embodiment 2 there is no such necessity thanks to the light-blocking members 49. This means that the color filter substrate 12 side black matrices 50 can be formed to have the same width as the TFTs 34, or alternatively, the black matrices 50 over the TFTs 34 can be omitted. In either case it will be possible to raise the aperture ratio of the liquid crystal display device 10.

The light-blocking members 48 that cover the signal lines 33 are shown in the drawings as being formed in a trapezoidal shape, but nevertheless are not limited to such a shape. The light-blocking members 48 might be formed to extend from the edges of the signal lines 33 to the edges of the pixel electrodes 40, or a light blocking member 48 might be deployed from one edge of a signal line 33 to a pixel electrode 40, and separately another light blocking member 48 be deployed from the other edge of the signal line 33 to the pixel electrode 40, that is, light blocking members 48 might be provided separately on either side of each signal line 33.

In order to make the liquid crystal display device 10 of the present invention into a semitransmissive rather than a transmissive one, all that need be done is to form minute concavo-convexities on the surface of the interlayer 39, except in the places where such film is formed over the apertural portions of the pixel domains, and to form in between such concavo-convex portions and the pixel electrodes 40 a reflective film constituted of a light reflecting material. Where it is desired to turn such a liquid crystal display device into a reflective one, it will suffice to form a reflective film over the entire area between the interlayer 39 and the pixel electrodes 40.

The invention claimed is:
1. A liquid crystal display device comprising:
a first substrate equipped with:

(a) signal lines, scan lines, and storage capacitor electrodes deployed in a matrix arrangement, the signal lines and the scan lines intersecting one another;
(b) thin film transistors provided near the intersections of said signal lines and scan lines;
(c) an interlayer that covers said thin film transistors; and
(d) pixel electrodes, wherein one of the pixel electrodes lies over said interlayer as well as is provided in each of a plurality of pixel domains delimited by said signal lines and scan lines, the pixel electrodes having a rectangular shape and covering the thin film transistors;

a second substrate on which are formed color filters and a common electrode; and a liquid crystal layer placed between said first substrate and second substrate, wherein:
(a) said pixel electrodes are positioned so as not to overlap said signal lines, or not to overlap said scan lines, or not to overlap either, when viewed from above;
(b) first insulative light-blocking members including first resin black matrix members are deployed below the spaces between adjacent pixel electrodes so as to overlap outer edges of said pixel electrodes when viewed from above, wherein the first insulative light-blocking members do not directly contact the signal lines;
(c) second light-blocking members including second resin black matrix members are provided over said thin film transistors, the second light-blocking members being adjacent to the first insulative light-blocking members, wherein the first light-blocking members do not directly contact the second light-blocking members;
(d) when viewed from above, the first resin black matrix member is positioned to overlap the signal lines; and
(e) when viewed from above, the second resin black matrix member is positioned to overlap the scan lines.

2. The liquid crystal display device according to claim 1, wherein the width of said signal lines or said scan lines, or both, is 3 to 5 µm, and the widths of said first light-blocking members are 6 to 10 µm.

3. The liquid crystal display device according to claim 1, wherein a black matrix is formed on said second substrate so as to correspond to said pixel domains.

4. The liquid crystal display device according to claim 3, wherein said first insulative light-blocking members and said second insulative light-blocking members are each composed of resin and the black matrix formed on the second substrate is composed of metal.

5. The liquid crystal display device according to claim 1, wherein an insulating layer is formed between the first insulative light-blocking members and the signal lines.

* * * * *